United States Patent
Ucasz

(10) Patent No.: US 11,149,572 B2
(45) Date of Patent: Oct. 19, 2021

(54) ADDITIVELY MANUFACTURED COMPONENT FOR A GAS POWERED TURBINE

(71) Applicant: United Technologies Corporation, Farmington, CT (US)

(72) Inventor: Mark T. Ucasz, Middletown, CT (US)

(73) Assignee: Raytheon Technologies Corporation, Farmington, CT (US)

(*) Notice: Subject to any disclaimer, the term of this patent is extended or adjusted under 35 U.S.C. 154(b) by 1128 days.

(21) Appl. No.: 15/335,761

(22) Filed: Oct. 27, 2016

(65) Prior Publication Data
US 2018/0119556 A1    May 3, 2018

(51) Int. Cl.
| | |
|---|---|
| F01D 9/06 | (2006.01) |
| F01D 5/14 | (2006.01) |
| F01D 5/18 | (2006.01) |
| F01D 11/00 | (2006.01) |
| B22C 9/10 | (2006.01) |
| B22F 5/04 | (2006.01) |
| B33Y 10/00 | (2015.01) |

(Continued)

(52) U.S. Cl.
CPC ............. *F01D 9/065* (2013.01); *B22C 9/10* (2013.01); *B22F 5/009* (2013.01); *B22F 5/04* (2013.01); *B22F 10/20* (2021.01); *B33Y 10/00* (2014.12); *B33Y 80/00* (2014.12); *F01D 5/147* (2013.01); *F01D 5/18* (2013.01); *F01D 5/187* (2013.01); *F01D 11/003* (2013.01); *F05D 2220/32* (2013.01); *F05D 2230/22* (2013.01); *F05D 2230/30* (2013.01); *F05D 2230/31* (2013.01); *F05D 2260/20* (2013.01); *Y02P 10/25* (2015.11)

(58) Field of Classification Search
CPC .. F01D 9/065; F01D 5/147; F01D 5/18; F01D 5/187; F01D 11/003; B33Y 10/00; B33Y 80/00; B22C 9/10; B22F 3/1055; B22F 5/04; F05D 2220/32; F05D 2230/22; F05D 2230/30; F05D 2230/31; F05D 2260/20
See application file for complete search history.

(56) References Cited

U.S. PATENT DOCUMENTS 8,488,994 B2    7/2013    Hanson et al.
9,174,312 B2    11/2015    Baughman et al.
(Continued)

FOREIGN PATENT DOCUMENTS

| EP | 2957380 | 12/2015 |
|---|---|---|
| EP | 3015190 | 4/2016 |

(Continued)

OTHER PUBLICATIONS

European Search Report for Application No. 17197985.9 dated Jun. 14, 2018.

*Primary Examiner* — J. Todd Newton
*Assistant Examiner* — Eric J Zamora Alvarez
(74) *Attorney, Agent, or Firm* — Carlson, Gaskey & Olds, P.C.

(57) ABSTRACT

A flowpath component includes a body having at least one internal cooling passage. The internal cooling passage is defined by a surface layer including a first material, and an interior layer comprising a second material. The second material is distinct from the first material. The surface layer and the internal layer are additively manufactured as a single unitary structure.

15 Claims, 4 Drawing Sheets

(51) Int. Cl.
*B33Y 80/00* (2015.01)
*B22F 5/00* (2006.01)
*B22F 10/20* (2021.01)

(56) References Cited

U.S. PATENT DOCUMENTS

| | | |
|---|---|---|
| 9,334,806 B2 | 5/2016 | Carter et al. |
| 9,393,620 B2 | 7/2016 | Bales et al. |
| 2011/0311389 A1 | 12/2011 | Ryan et al. |
| 2013/0071562 A1 | 3/2013 | Szuromi et al. |
| 2013/0316084 A1 | 11/2013 | Szuromi et al. |
| 2014/0099476 A1* | 4/2014 | Subramanian .......... B22F 5/009 428/164 |
| 2014/0255198 A1 | 9/2014 | El-Wardany et al. |
| 2015/0034604 A1* | 2/2015 | Subramanian ............ B22F 7/02 219/73.21 |
| 2015/0144496 A1* | 5/2015 | Morris ................... F01D 5/186 205/261 |
| 2016/0010469 A1 | 1/2016 | Guo |
| 2016/0236271 A1 | 8/2016 | Xu |
| 2016/0319678 A1* | 11/2016 | Staroselsky ............ B33Y 80/00 |

FOREIGN PATENT DOCUMENTS

| | | |
|---|---|---|
| EP | 3034206 | 6/2016 |
| WO | 2015012221 | 1/2015 |

* cited by examiner

ADDITIVELY MANUFACTURED COMPONENT FOR A GAS POWERED TURBINE

TECHNICAL FIELD

The present disclosure relates generally to additively manufactured gas powered turbine components, and more specifically to internal cooling passage features of the same.

BACKGROUND

Gas turbine engines generally operate by compressing a gas in a compressor and providing the compressed gas to a combustor. In the combustor, the compressed gas is mixed with a fuel and ignited, generating high temperature combustion gasses. The high temperature combustion gasses are then expanded across a turbine section, driving the turbine section to rotate. Rotation of the turbine section, in turn, drives the compressor to rotate. In some gas powered turbines, such as a geared turbofan, the rotation of the turbine section further drives the rotation of a fan forward of the compressor.

The high temperature combustion gasses expose the gaspath components to substantial amounts of thermal cycling and heat stress. In order to reduce the thermal stresses, and thereby improve the component life, of any given flowpath component, the flowpath components are actively cooled. In some examples, the active cooling is achieved at least in part via cooling passages internal to the flowpath component.

Typical methods of manufacturing gaspath components include various methods of removing material from a starting blank of material to form a desired completed part shape and casting a desired completed part shape around an investment casting core. Such methods utilize cutting tools and casting cores to form holes, surfaces, passages, overall shapes and the like.

In some examples, once the completed part is formed, finishing processes are applied to the part. The finishing processes can include, but are not limited to, the application of coatings to the internal cooling passages. The coating typically serves to extend the service life of the component by reducing oxidation and/or corrosion within the internal cooling passages. As a result of the completed structure, and the tortuous nature of the internal cooling passages, such coatings are not applied evenly throughout the internal cooling passages, and the variations in the thickness of the coating are not controlled.

SUMMARY OF THE INVENTION

In one exemplary embodiment a flowpath component includes a body including at least one internal cooling passage. The internal cooling passage being defined by a surface layer including a first material, and an interior layer comprising a second material distinct from the first material and wherein the surface layer and the internal layer are additively manufactured as a single unitary structure.

In another exemplary embodiment of the above described flowpath component the surface layer has a uniform thickness.

In another exemplary embodiment of any of the above described flowpath components the internal cooling passage includes at least one altered cooling region.

In another exemplary embodiment of any of the above described flowpath components the surface layer comprises a third material at the at least one altered cooling region.

In another exemplary embodiment of any of the above described flowpath components the surface layer at the at least one altered cooling region has a first thickness distinct from a remainder of the surface layer.

In another exemplary embodiment of any of the above described flowpath components the thickness of the surface layer is a gradient as the surface layer approaches the at least one altered cooling region.

In another exemplary embodiment of any of the above described flowpath components the thickness of the surface layer at the at least one altered cooling region is greater than the thickness of the surface layer at the remainder of the surface layer.

In another exemplary embodiment of any of the above described flowpath components the thickness of the surface layer at the at least one altered cooling region is less than the thickness of the surface layer at the remainder of the surface layer.

Another exemplary embodiment of any of the above described flowpath components further includes a supplementary layer applied to the surface layer.

In another exemplary embodiment of any of the above described flowpath components the supplementary layer is at least one of a vapor deposition layer and a slurry deposition layer.

In another exemplary embodiment of any of the above described flowpath components the surface layer covers approximately all of an interior surface of the at least one internal cooling passage.

Another exemplary embodiment of any of the above described flowpath components further includes a platform, wherein the body extends outward from the platform.

In another exemplary embodiment of any of the above described flowpath components the component is one of a blade outer air seal, a vane, and a blade.

In another exemplary embodiment of any of the above described flowpath components the at least one internal cooling passage includes at least one cooling hole connected to an exterior surface of the flowpath component.

An exemplary method for manufacturing a flowpath component includes additively manufacturing at least one of a platform and a body. The at least one of the platform and the body including at least one internal cooling passage having a surface layer constructed of a first material and an interior layer constructed of a second material, distinct from the first material.

In another example of the above described method for manufacturing a flowpath component additively manufacturing the surface layer includes creating a uniform thickness surface layer across approximately all of the at least one internal cooling passage.

In another example of any of the above described methods for manufacturing a flowpath component additively manufacturing the surface layer comprises creating at least one altered cooling region within the at least one internal passage, the surface layer at the altered cooling region having a first thickness and a remainder of the surface layer having a second thickness.

Another example of any of the above described methods for manufacturing a flowpath component further includes creating a gradient thickness transitioning to the altered cooling region.

In another example of any of the above described methods for manufacturing a flowpath component additively manufacturing the at least one of a platform and a body includes iteratively manufacturing layers, with a plurality of the layers including a surface layer portion and an interior layer portion.

These and other features of the present invention can be best understood from the following specification and drawings, the following of which is a brief description.

DETAILED DESCRIPTION OF AN EMBODIMENT

An alternative manufacturing process to the above described casting and machining processes is additive manufacturing. In some examples, additive manufacturing utilizes a heat source such as a laser beam to melt layers of powdered metal to form the desired part configuration layer upon layer. The laser forms a melt pool in a layer of powdered metal that solidifies. Another layer of powdered material is then spread over the solidified part and melted to the previous melted layer to build a desired part geometry layer upon layer. Powdered material that is applied but not melted to become a portion of the part accumulates around and within the part.

In basic examples, the powder material utilized in each iteration of the process is identical, resulting in a structure created of a uniform material. In more advanced examples, the powders applied at each iteration can be varied and include different material compositions, allowing the end part to be a single unitary structure with portions constructed of two or more distinct materials, alloys, or coatings.

Figure 1:
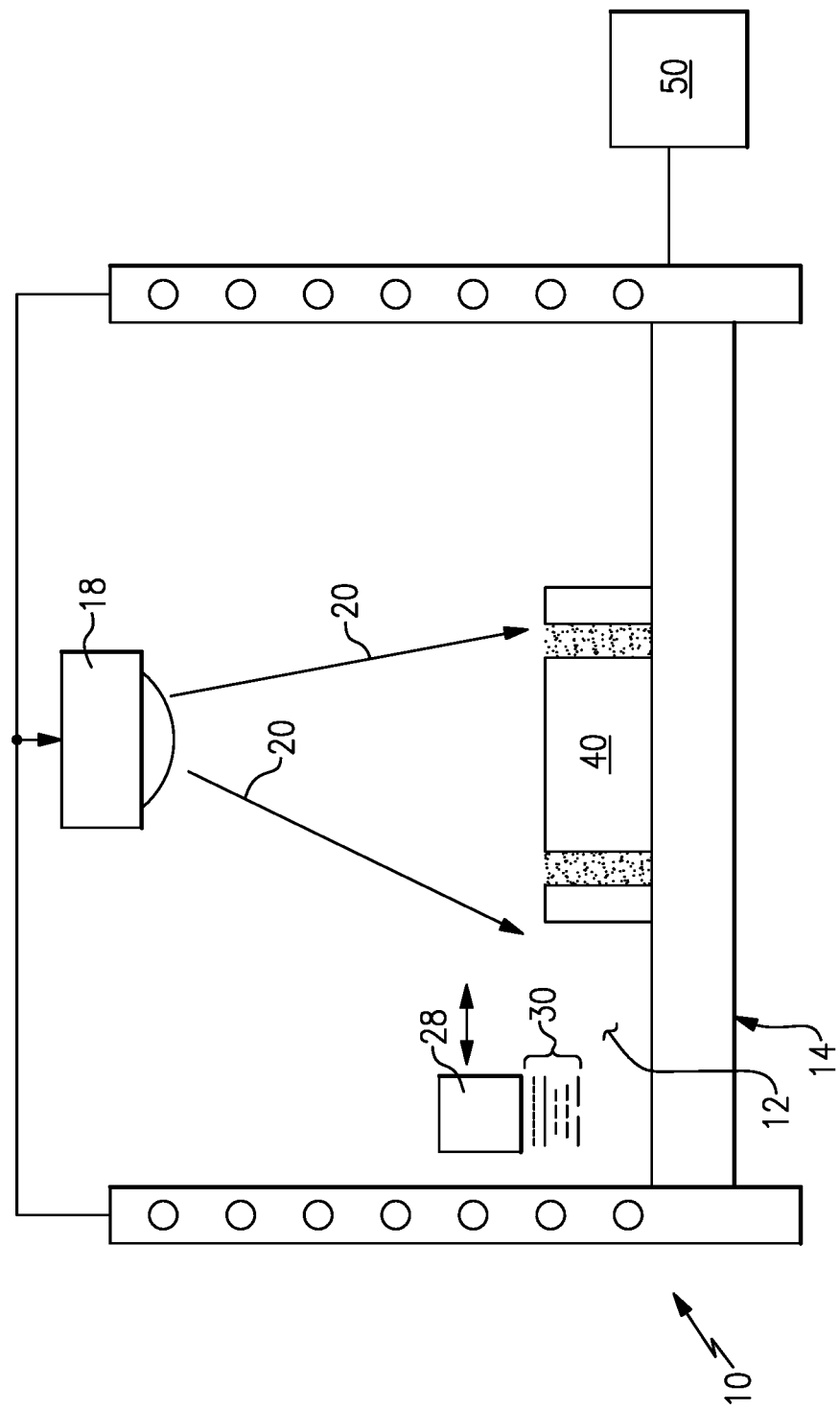
FIG. 1 schematically illustrates an exemplary additive manufacturing machine.

FIG. 1 schematically illustrates an exemplary additive manufacturing machine 10 configured to create a gaspath component. The additive manufacturing machine 10 includes a work space 12 that supports an energy transmitting device 18 and a base plate 14 on which a part 40 is supported during fabrication. In this example, the energy-transmitting device 18 emits a laser beam 20 that melts material 30 deposited by a material applicator 28. In examples utilizing multiple powders of different material compositions, multiple material applicator's 28 can be utilized instead of the single illustrated material applicator 28. The example material 30 is a metal powder that is applied in a layer over the base plate 14 and subsequent layers are applied to produce a desired configuration of the part 40. The laser beam 20 directs energy that melts the powder material in a configuration that forms the desired part dimensions.

The additive manufacturing process utilizes material 30 that is applied in layers on top of the base plate 14. Selective portions of the layers are subsequently melted by the energy emitted from the laser beam 20. The energy focused on the top layer of the part 40 generates the desired heat to melt portions of the powdered metal. Conduction of heat through the solidified portions of the part and convection cooling to the ambient environment solidifies the melted portions to build and grow the part 40. The melting and solidification process is repeated layer by layer to build the part 40.

In a practical implementation, the additive manufacturing machine 10 is controlled via a computer 50, or other similar controller, that is connected to the additive manufacturing machine 10. Alternatively, the computer 50 can be integrated into the additive manufacturing machine 10. In either case, a completed part specification is entered into the computer 50 and the computer 50 determines how to construct the part 40 based on the particular additive manufacturing process of the additive manufacturing machine 10.

Figure 2:
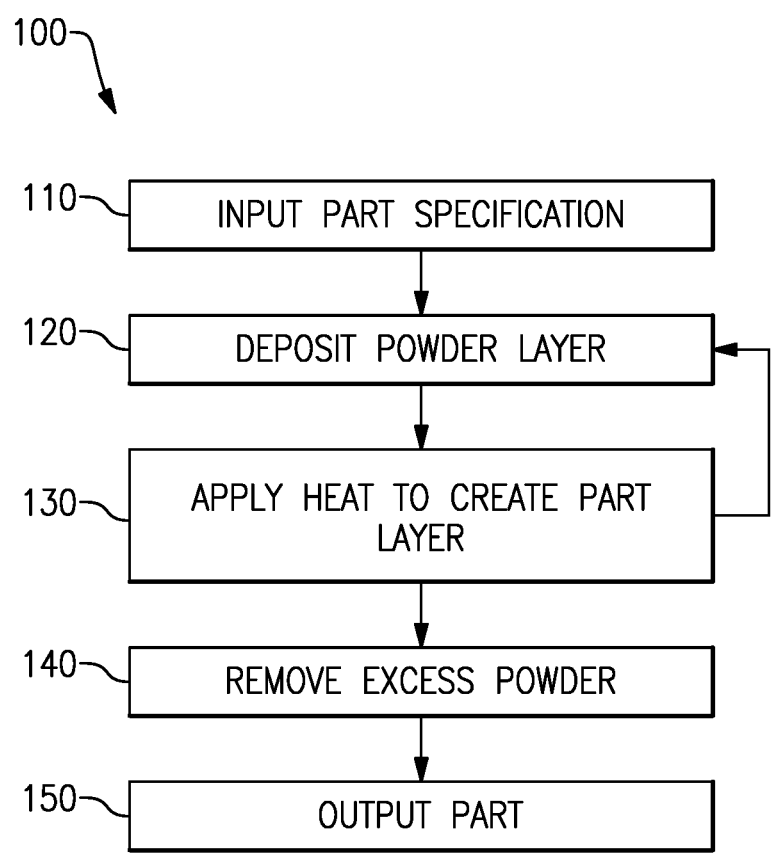
FIG. 2 illustrates a method for producing a gaspath component using the additive manufacturing machine of FIG. 1.

With continued reference to FIG. 1, FIG. 2 illustrates an exemplary process 100 utilized by the additive manufacturing machine 10 to generate a part 40. Initially a user inputs the part specification into the computer 50 in an "Input Part Specification" step 110. The computer 50 then determines the appropriate layers, and additive process to generate the desired part 40. In alternative systems, the appropriate layers and process to generate the desired part 40 can be determined prior to inputting the specification, and the specification itself can include each of the desired layers.

Once the desired layers and processes are determined by the computer 50, the additive manufacturing machine 10 deposits a layer of powder on the base plate 14 in a "Deposit Powder Layer" step 120. In some examples, the material applicator 28 is configured to deposit only a single material, and every iteration of step 120 deposits the same material. In other examples, the material applicator 28 can deposit multiple different materials, alloys, or coating chemistries, and each iteration can deposit the same or different materials from the previous iteration, depending on the needs of the specific process. In yet other examples, the material applicator 28 can deposit different materials in different locations, or provide a gradient of materials across a distance within a single iteration of the deposit powder layer step 120.

Once the layer has been deposited, the additive manufacturing machine 10 applies heat to the powder via the energy transmitting device 18 in an "Apply Heat to Create Part Layer" step 130. The heat melts the powder in a specific location adhering the layer to any previous layers, and causing the layer to be generated in a specific desired shape. Steps 120 and 130 are then iterated multiple times to create a desired three dimensional geometry of the part 40 being generated.

Once the full three dimensional geometry has been created, the excess unmelted powder is removed from the part 40 in a "Remove Excess Powder" step 140. The excess powder can be removed using any conventional means including, but not limited to, vibrations, air pressure, washing and the like. After removing the excess powder, the completed part is output in an "Output Part" step 150.

In some examples, the output part 150 can be further subjected to finishing processes such as polishing, application of additional coatings via vapor deposition, slurry deposition, and the like, or any other finishing process.

Figure 3:
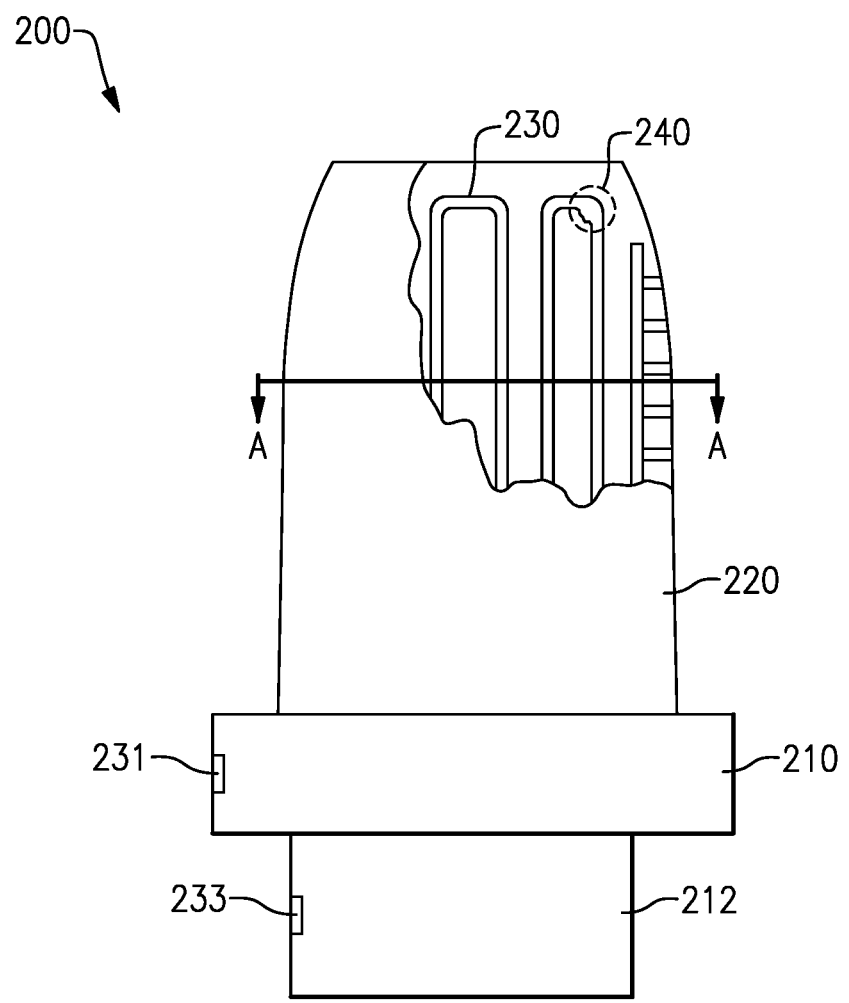
FIG. 3 schematically illustrates an exemplary additively manufactured gaspath component, including an internal view.

With continued reference to FIGS. 1 and 2, FIG. 3 schematically illustrates an exemplary gaspath component 200 constructed using an additive manufacturing process, such as the process described above. In the example of FIG. 3, the gaspath component is a turbine blade including a platform 210 and a blade 220 extending outward form the platform 210. Alternative gaspath components such as blade outer air seals, vanes, and the like can be constructed in a similar manner, utilizing similar internal cooling passage features, and are understood to be within the scope of this disclosure.

Incorporated within the blade 220 are multiple tortuous cooling passages 230. During operation, cooling air is provided to the internal cooling passages 230 through an inlet 231, 233 in the platform 210, root 212, or both. In some examples, the platform and root can also include internal cooling passages, and the distinct cooling passages could receive cooling air from distinct sources. While illustrated as a single tortuous cooling passageway 230, one of skill in the art having the benefit of this disclosure will appreciate that any number of cooling passages of varying size and geometry can be utilized depending on the particular cooling needs of the gaspath component 200.

In some examples, it is desirable to coat some or all of the internal facing surface of the tortuous cooling passage 230 with a coating layer that is distinct from the material utilized to construct the primary body of the gaspath component 200, thereby creating a surface layer of a distinct material from the interior layer. In further examples, a similar process can be applied to cooling holes connecting cooling passages to an external surface of the gaspath component. In an ideal example, a specific coating composition is designed and utilized, with the specific composition corresponding to the expected conditions (temperature range of internal section, corrosion specific damage or oxidation specific damage) of the gaspath component being manufactured. In some examples it is also possible to vary the alloy composition within the additive manufacturing process to take advantage of the same properties and/or to alter the thermomechanical properties of the alloy creating one of the surfaces. Existing systems typically implement such a coating by casting the gaspath component, then providing the coating to the internal cooling passage 230 via a vapor deposition process. However, such a process is unable to control the thickness of the coating throughout the entirety of the passage 230, and a uniform thickness, or controlled thickness at target areas, cannot be achieved. Further, utilizing this process does not allow for a portion of the passage 230 to be coated without coating the entirety of the passage 230.

Figure 4:
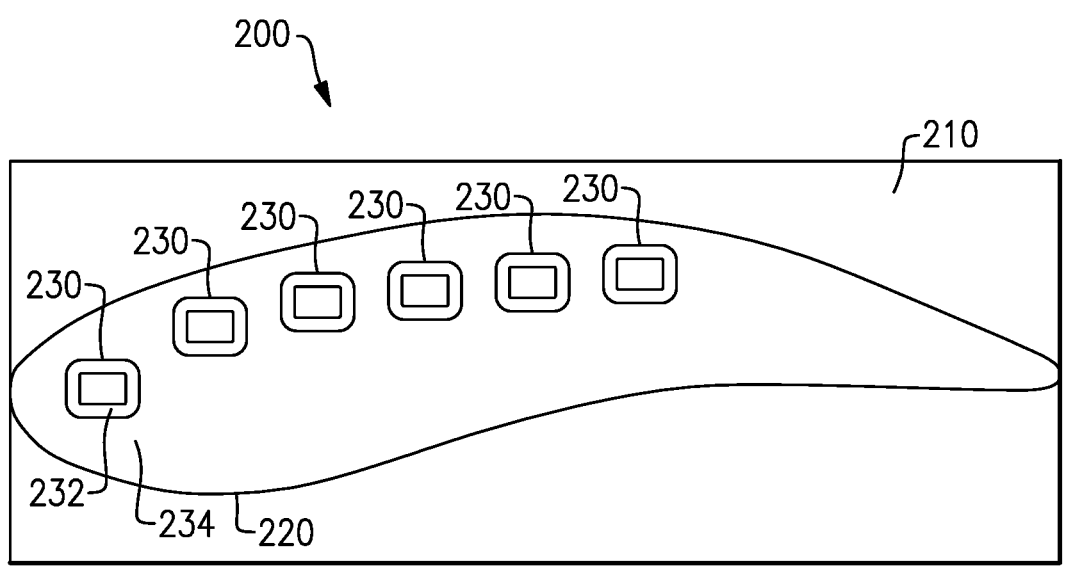
FIG. 4 schematically illustrates a cross section of the gaspath component of FIG. 3, along view line A-A.

With continued reference to FIG. 3, FIG. 4 schematically illustrates a cross sectional view of the gaspath component 200 along view lines A-A. FIGS. 3 and 4 are not to scale, and certain elements, as well as relative dimensions, are exaggerated for explanatory effect. Each of the cooling passages 230 includes a surface layer 232 extending from the body, which is alternatively referred to as the interior layer 234, into the passage 230. The thickness of the surface layer 232 refers to the depth of the surface layer 232 normal to an expected direction of fluid flow through the passage 230 at the location the thickness is being determined. In some examples, the surface layer 232 is a single material across the entirety of the layer 232. In alternative examples, the surface layer 232 can be constructed of multiple materials in different portions depending on the coating requirements, or alloy property requirements of the specific surface, in any given portion.

In order to achieve uniform, or targeted, thickness of the surface layer 232 of the passage 230, the additively manufacturing system manufactures the surface layer 232 in the same process as the body of the gaspath component 200. In some examples, each layer of the component 200 is constructed in two passes, with the first pass creating either the interior layer 234 or the surface layer 232, and the second pass constructing the other of the interior layer 234 and the surface layer 232. In alternative systems, where multiple materials can be constructed in a single pass, both the surface layer 232 and the interior layer 234 can be constructed simultaneously. By constructing the surface layer 232 as part of the additive manufacturing process, the additive manufacturing machine 10 ensures that the surface layer has a uniform depth, normal to the expected flow of fluid through the passage 230, throughout all or most of the passage 230, and that the surface layer 232 is a unitary structure with the interior layer 234.

In some examples, the surface layer 232 is not required over the entirety of the cooling passage 230. In these examples, the additive manufacturing process only creates the surface layer 232 in the areas specifically requiring the surface layer 232, and the remainder of the passage 230 is exposed to the interior layer 234.

In some examples certain areas 240, such as one or more bends, thermal exposure regions, or other areas of concern for oxidation or corrosion in the passage 230, are subjected to different thermal stresses than the remainder of the cooling passage. Such areas 240 are referred to herein as "altered cooling zones". In some examples, such as those where increased cooling or coating protection is required at the altered cooling zone, it is desirable for the surface layer 232 of the cooling passage 230 at the altered cooling zones 240 to be thicker than the surface layer 232 at a remainder of the passage 230. In alternative examples, the altered cooling zone is subjected to reduced thermal stresses and the surface layer 232 of the passage 230 at the altered cooling zone 240 is thinner than the surface layer 232 at the remainder of the passage 230.

In some examples, the transition of the thickness of the surface layer 232 into, and out of, the altered cooling zone 240 can be achieved using a gradient, where the thickness gradual increases or decreases along the expected direction of flow through the cooling passage 230. In alternative examples, the thickness of the surface layer 232 can be a discrete change from the thickness of the surface layer 232 at the altered cooling zone 240 to the thickness of the surface layer 232 at the remainder of the passage 230.

In yet further examples, a finishing process, or combination of finishing processes, such as vapor deposition or slurry deposition, can be utilized to further applying a supplemental layer interior to the surface layer, thereby providing further protection and/or altering the material properties of the surface layer and enhancing the thermal durability of the cooling passage 230.

While described above with regards to a laser based additive manufacturing system, one of skill in the art having the benefit of this disclosure will understand that the above described process can be applied to any additive manufacturing technique, and is not limited to laser based additive manufacturing techniques.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A flowpath component comprising:
a body including at least one internal cooling passage;
the at least one internal cooling passage being defined by
 a surface layer comprising a first material, and an interior layer comprising a second material distinct from the first material;
the at least one internal cooling passage including at least one altered cooling region, wherein the surface layer at the altered cooling region comprises a third material distinct from the first material and the second material; and wherein the surface layer and the internal layer are additively manufactured as a single unitary structure.

2. The flowpath component of claim 1, wherein the surface layer at the at least one altered cooling region has a first thickness distinct from a remainder of the surface layer.

3. The flowpath component of claim 2, wherein the thickness of the surface layer is a gradient as the surface layer approaches the at least one altered cooling region.

4. The flowpath component of claim 3, wherein the thickness of the surface layer increases along an expected direction of flow through the cooling passage as the surface layer approaches the at least one altered cooling region.

5. The flowpath component of claim 3, wherein the thickness of the surface layer decreases along an expected direction of flow through the cooling passage as the surface layer approaches the at least one altered cooling region.

6. The flowpath component of claim 2, wherein the thickness of the surface layer at the at least one altered cooling region is greater than the thickness of the surface layer at the remainder of the surface layer.

7. The flowpath component of claim 2, wherein the thickness of the surface layer at the at least one altered cooling region is less than the thickness of the surface layer at the remainder of the surface layer.

8. The flowpath component of claim 2, wherein a transition from a thickness of the remainder of the surface layer to the first thickness is a discrete step.

9. The flowpath component of claim 1, further comprising a supplementary layer applied to said surface layer.

10. The flowpath component of claim 9, wherein said supplementary layer is at least one of a vapor deposition layer and a slurry deposition layer.

11. The flowpath component of claim 1, wherein the surface layer covers all of an interior surface of the at least one internal cooling passage.

12. The flowpath component of claim 1, further comprising a platform, wherein the body extends outward from the platform.

13. The flowpath component of claim 1, wherein the component is one of a blade outer air seal, a vane, and a blade.

14. The flowpath component of claim 1, wherein the at least one internal cooling passage includes at least one cooling hole connected to an exterior surface of the flowpath component.

15. The flowpath component of claim 1, wherein the altered cooling region is a region of the internal cooling passage where an expected direction of flow bends.

* * * * *